United States Patent [19]
Pölzl

[11] Patent Number: 5,722,555
[45] Date of Patent: Mar. 3, 1998

[54] TRANSPORT AND STORAGE CONTAINER

[75] Inventor: Franz Pölzl, Marchtrenk, Austria

[73] Assignee: Steiner Freizeitmöbel Gesellschaft m.b.H. & Co. KG, Pinsdorf/Aurachkirchen, Austria

[21] Appl. No.: 647,948

[22] PCT Filed: Nov. 17, 1994

[86] PCT No.: PCT/AT94/00172

§ 371 Date: May 31, 1996

§ 102(e) Date: May 31, 1996

[87] PCT Pub. No.: WO95/13970

PCT Pub. Date: May 23, 1995

[30] Foreign Application Priority Data

Nov. 19, 1993 [AT] Austria .................................. 2341/93

[51] Int. Cl.[6] ............................................. B65D 43/12
[52] U.S. Cl. ......................... 220/345; 220/346; 220/331; 49/465
[58] Field of Search ......................... 220/315, 345, 220/346, 331, 3.8; 49/463, 465

[56] References Cited

U.S. PATENT DOCUMENTS

| | | | |
|---|---|---|---|
| 1,179,869 | 4/1916 | Schmidt | 49/465 |
| 2,579,655 | 12/1951 | Donald | 220/331 |
| 4,192,430 | 3/1980 | Cornou | 220/331 |
| 4,325,646 | 4/1982 | Sasaki | 220/346 |
| 5,238,115 | 8/1993 | Schafer | 220/331 |

FOREIGN PATENT DOCUMENTS

| | | |
|---|---|---|
| 2145550 | 12/1973 | Germany. |
| 2909136 | 9/1979 | Germany. |
| 4342916 | 9/1994 | Germany. |
| 4311142 | 10/1994 | Germany. |
| 537842 | 7/1973 | Switzerland. |

Primary Examiner—Stephen J. Castellano
Attorney, Agent, or Firm—Collard & Roe, P.C.

[57] ABSTRACT

The invention concerns a transport and storage container for package freights, the aim of the invention being to permit such freight material to be removed from containers through an opening in the side even when the containers are stacked one on top of the other. Disposed in one of the side walls (4) or face walls (6, 7) is a flap (8) the height of which is less than the height (16) of the opening by an amount at least equal to the vertical width of a mounting slot (13) in which the flap is mounted. The flap (8) is mounted by means of bearing pins (9) which fit in mounting slots (12, 13) so that it can move vertically and pivot and so that it can be locked in place in the opening by means of locking pins (10, 11). The container proposed also meets the requirements for ease of recycling by virtue of the fact that only a single material is use in its construction.

4 Claims, 4 Drawing Sheets

5,722,555

TRANSPORT AND STORAGE CONTAINER

The invention relates to a transport and storage container made of plastic.

A container of this kind is already known from CH-PS-537 842, in which access to the container is only possible by means of a one-piece slide when the latter is lifted vertically upwards either completely or partly. Access through the side opening is not possible when the containers are stacked on top of one another.

Furthermore, a container is known from DE-OS-29 09 136 in which access to the container is possible from the side even when the containers are stacked, but the flap itself comprises at least two parts which are hinge connected. The hinge connection and the locking mechanisms are expensive to construct with respect to their manufacture.

The objective of the invention is to design the opening flap in such a way that the flap is made in one piece and is easy to install and remove, so that the flap can also be operated when the containers are stacked, and the entire container, the flap, the connecting system between the container and the flap and the pivot and locking mechanism, is made from a single material and all the side walls together with the flaps located therein can be opened into the plane of the base plate.

The objective of the invention is achieved with transport and storage container with a base and side walls, in which at least one side wall forms a frame, in which closed at the top, for inserting a flap than can be pivoted off. The flap engages in bearing eyes of the frame side parts by means of coaxially arranged lower bearing pins projecting on both sides and which can be inserted by locking pins, projecting on both sides and arranged above the bearing pins, into mounting slots of the frame side parts which are accessible via insertion openings from an outer surface. The inside height of the frame of the flap-bearing side wall or face wall is greater than the flap height, and the slot height of the mounting slots is equal to or smaller in height than the height difference between the frame and flap. At least one of the mounting slots comprises a restriction as a detent for the corresponding locking pins, and the mounting slots forming the bearing eyes for the bearing pins are longitudinal slots. The surprising advantage is that it is still possible to open the flaps when the containers are stacked on top of one another and the flap itself is made in one piece, and thus does not have an expensive folding-door-like construction.

It is also an advantage that expensively formed hinge axes, which are expensive to construct with respect to their manufacture, are not necessary and despite this the pivot-opening function is maintained.

For a better understanding of the invention, the latter is explained in more detail with reference to the embodiments illustrated in the drawings, in which.

Figure 1:
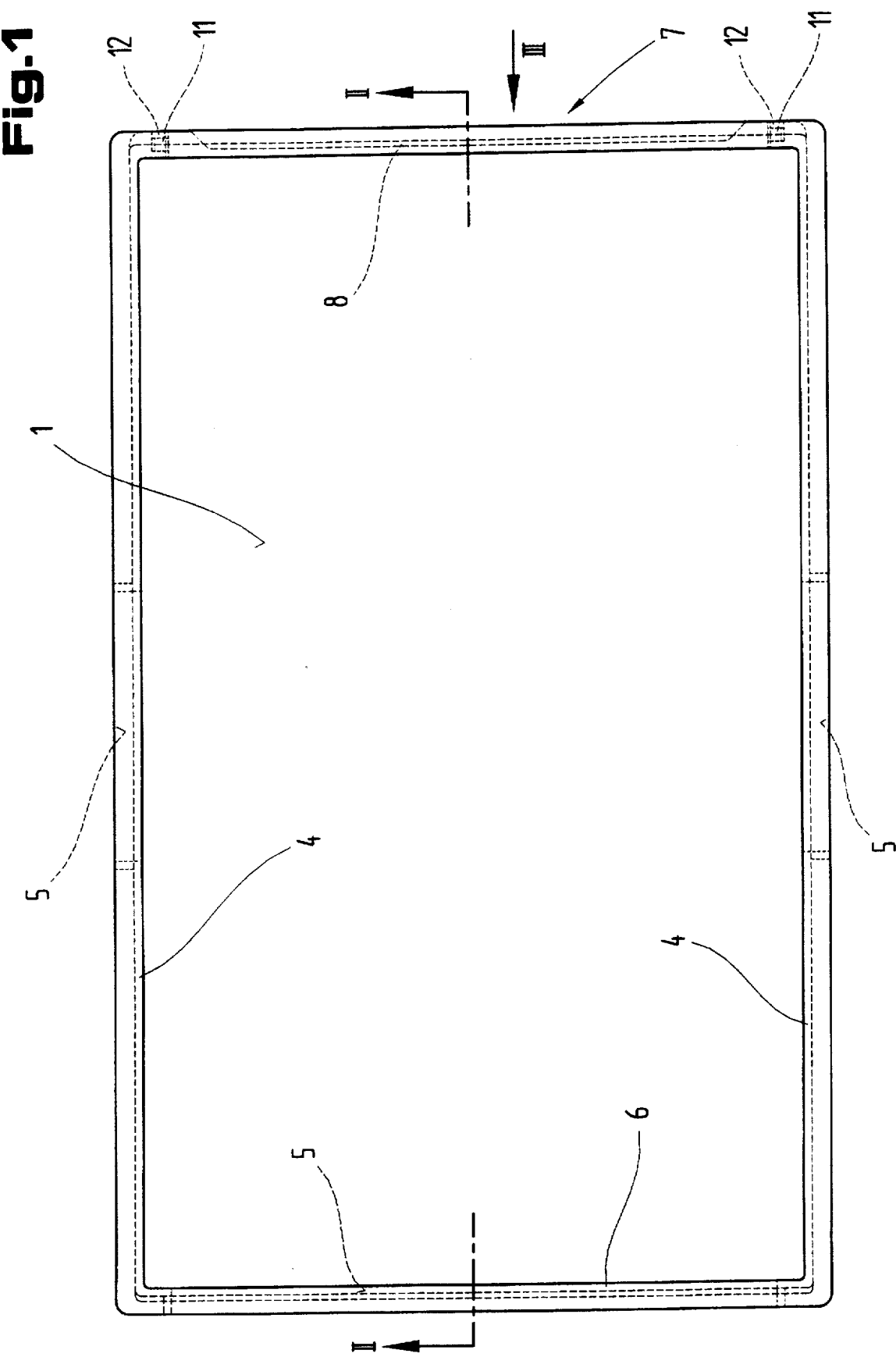
FIG. 1 shows a transport and storage container according to the invention viewed from above.
Figure 2:
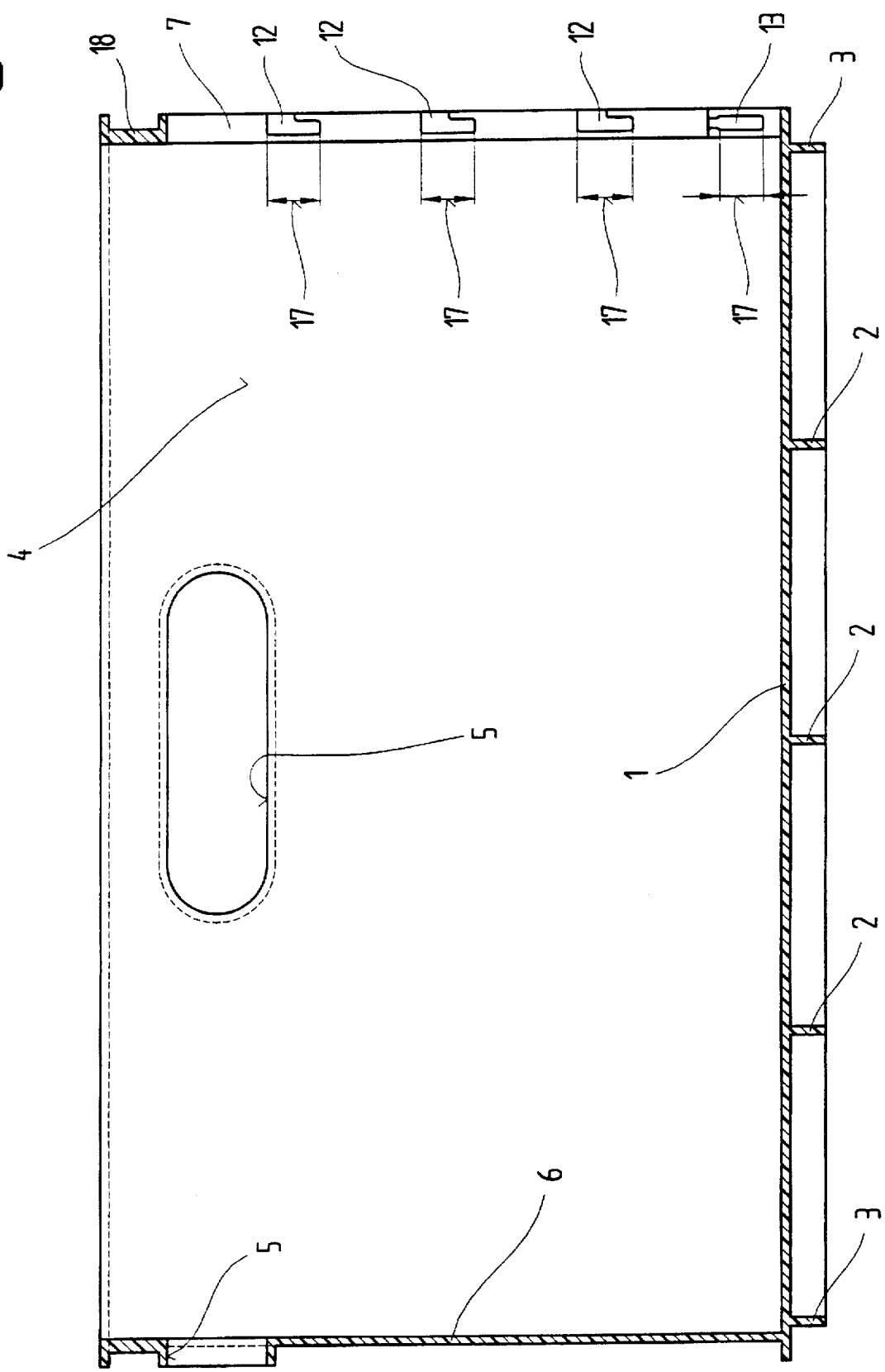
FIG. 2 shows the transport and storage container in cross section along the line II—II in FIG. 1 with the flap removed.
Figure 3:
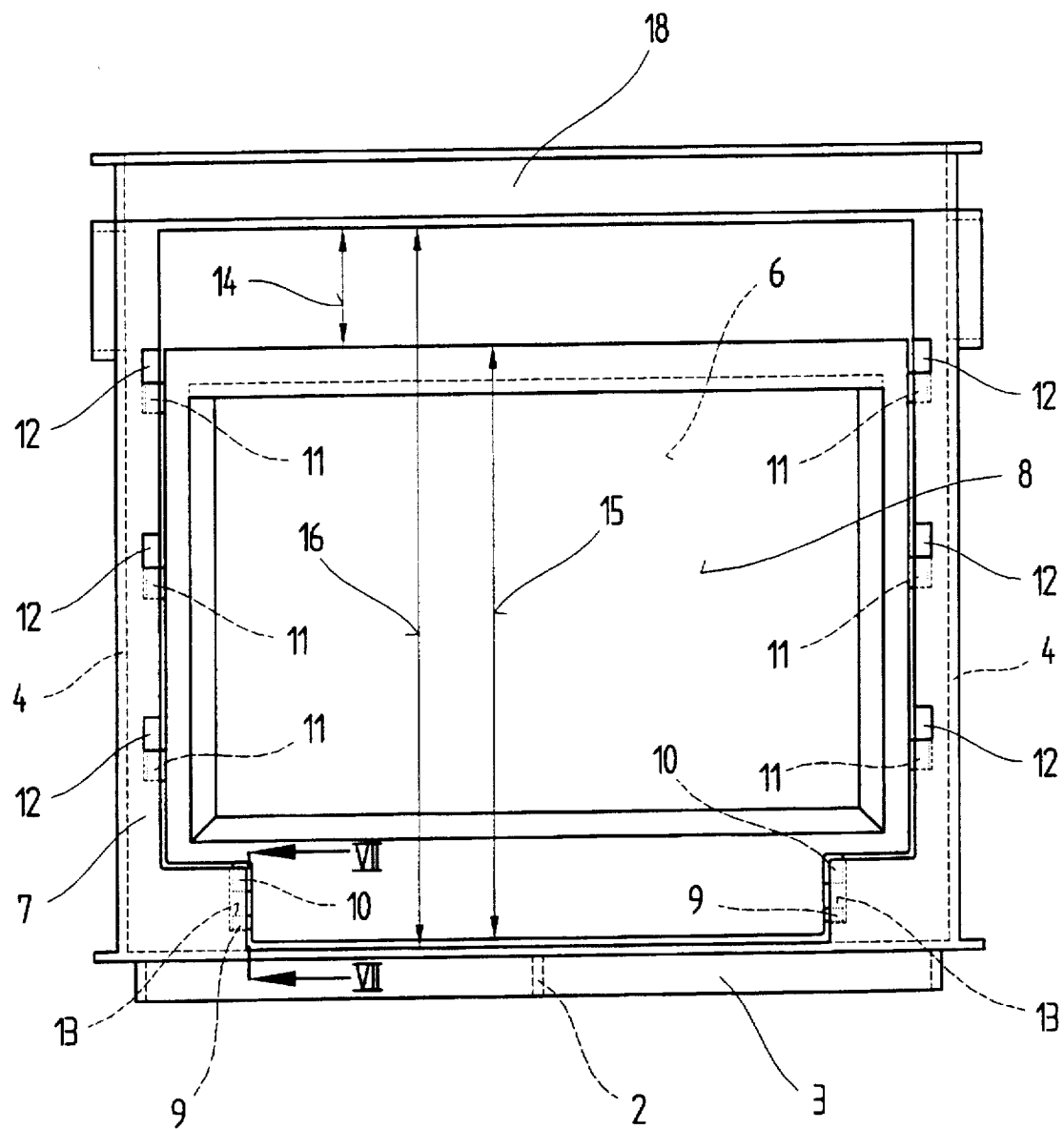
FIG. 3 shows the transport and storage container viewed according to arrow III in FIG. 1.
Figure 4:
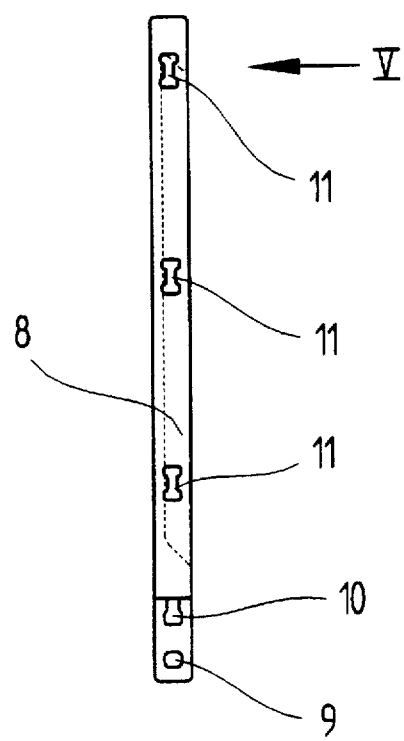
FIG. 4 shows a flap of the transport and storage container according to the invention in a front view.

FIGS. 1 to 7 show a transport and storage container made of plastic for package freight with a rectangular base 1 and four walls. The base 1 is holohedrical or lattice-shaped and has reinforcement ribs 2 on its underside, the outside edge 3 of which is set back relative to the end walls, so that when the boxes are stacked it can be lowered into an open-topped box and lateral sliding can be prevented. The two side walls 4 are closed holohedrically or lattice-shaped and have oval grip openings 5. A face wall 6 is also closed holohedrically or lattice-shaped and also has a grip opening 5. At least one of the four walls, e.g. another face wall 7, comprises a flap 8. The latter can be completely folded back so that when it is open access is provided to the container from the side and when it is closed it is in alignment with the fixed side wall part.

The flap-bearing face wall 7, containing a flap opening, comprises a known closed frame. The opening in the frame is rectangular with recessed corners in the region of bearing pins 9.

The flap 8 itself has lateral bearing pins 9 and locking pins 10, 11 which engage in mounting slots 12, 13 in the adjoining vertical sides of the frame.

The bottom locking pins 10 and the bearing pins 9 engage in mounting slots 13, e.g. vertical slots, and are adjustable in height. The other locking pins 11 engage in L-shaped outwards projecting mounting slots 12. To enable vertical lifting in the following pivot-opening movement the height difference 14 between the flap height 15 and the inside height 16 of the flap opening is greater than or equal to the slot length 17 of the mounting slots 12, 13. A gap in the outer wall of the container, which remains even when the flap is closed, on the one hand permits the vertical lifting of the flap in its plane to enable the following pivot opening and on the other hand forms a grip opening. A horizontal overlying crossbeam 18 of the frame thus also fulfils the function of a carrying grip.

The bearing pins 9 are cylindrical with flattened edges 19 perpendicular to the flap plane and form an axis of rotation. The bottom, vertical mounting slot 13 is open at the top, but has a restriction 20 in the upper opening, which forms a passage 21. The lower part of the mounting slot 13 is slightly wider than the diameter of the cylindrical bearing pin 9, and thus vertical movement is possible. The restriction 20 or passage 21 is narrower than the diameter of the bearing pin 9, but has the same width as the bearing pin 9 measured at right angles to the flattened edges 19. In this way a simple adjustment in height is possible in the broad section up to the restriction 20 of the mounting slot 13 on vertical lifting and complete vertical removal is prevented.

If after lifting to unlock the flap 8, the latter is pivoted into the horizontal plane and then lifted again, only the flattened-edge (smaller) diameter of the bearing pin 9 is operative and can be guided through the restriction 20 in the mounting slot 13 using a small amount of force. In this way the flap 8 can be detached from the frame or container or installed in a reverse process.

Directly above the lower bearing pin 9 which forms the axis of rotation a further locking pin 10 is attached to the flap 8 on each side which has a securing function. It has a prismatic shape and in cross section comprises a narrower link arm 22 and thicker head 23 (cf. FIG. 7). The shape corresponds with slightly smaller dimensions to the upper half of the bottom mounting slot 13 and the restricted opening. The similarity of these shapes permits an engagement ("snapping-in") on lowering the flap 8 vertically and thus locks the flap 8 in a closed position.

Figure 5:
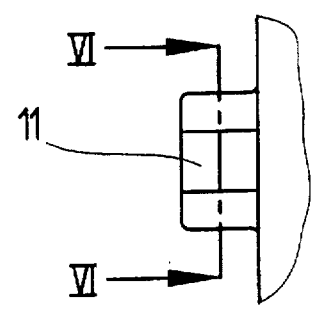
FIG. 5 shows a view of a locking pin of the flap.
Figure 7:
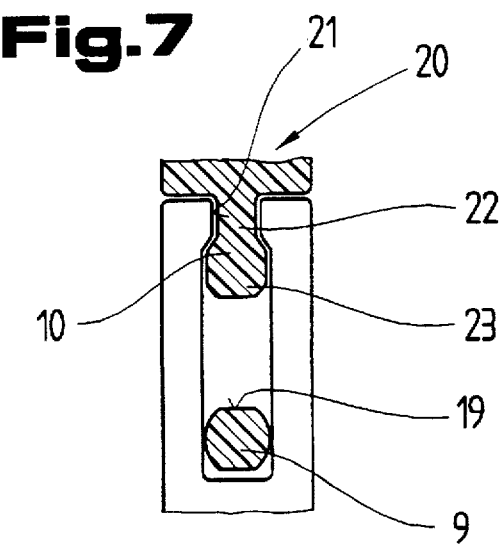
FIG. 7 shows a mount and a bearing pin of the flap in cross section along the line XII—XII in FIG. 3.
Figure 6:
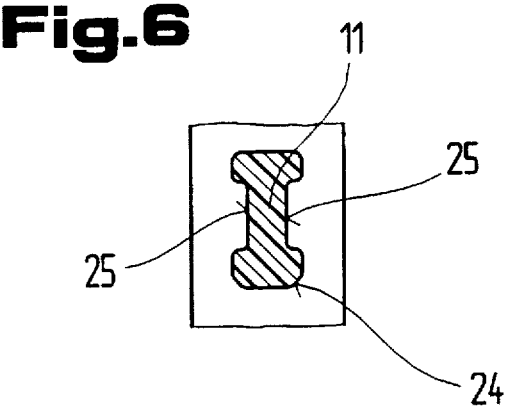
FIG. 6 shows the locking pin of the flap, in cross section along the line XI—XI in FIG. 5.

The other locking pins 11 of the flap 8 have a prismatic shape, as shown in particular in FIGS. 5 and 6, and in cross section are rectangular with rounded corners 24, whereby the lower corners are more rounded to facilitate insertion into the vertical part of the L-shaped mounting slot 12. The locking pin 11 is narrowed in the middle section 25 on both sides like a cam. The horizontal part of the L-shaped mounting slot 12 is slightly larger than the corresponding height of the locking pin 11 and thus simple horizontal insertion and subsequent pivoting of the flap 8 into the side wall plane is possible. The vertical part of the L-shaped mounting slot 12 is the same size as the narrow side of the locking pin 11. In this way vertical movement is possible with a small amount of force and there is a "tolerance-free" guiding into the slots, and thereby a stable (not loose) connection with the side wall frame is made. By means of the cam-shaped narrowed section the locking pin 11 rests in the mounting slot 12 at four points. Because of the elasticity of the material relatively high compressive stresses can be achieved by the small bearing surfaces with a small application of force, whereby the flap 8 can be guided precisely and fixed securely in the closed position in a smooth operation. The flap 8, as described above and illustrated in the drawings, can of course also be fitted into several side walls. Furthermore, it is shown that the entire container as described can be made from a single material. This is achieved in that the flap 8 with its locking and bearing pins 10, 11, 9 is produced in one piece in a die cast mould according to a known process. The same applies to the container itself. The use of one material means that once the container is no longer functional it can be recycled easily.

The construction, which makes it possible to fold all four side walls into the plane of the base plate and when empty requires much less space is assumed to be known and is not described in more detail here.

The combination of side walls which can be folded into the base plane and the flap located in at least one of the side walls is possible by means of the above described frame construction of the remaining part of the wall surrounding the flap.

LIST OF REFERENCE NUMBERS

| | |
|---|---|
| 1 base | 16 height |
| 2 reinforcement rib | 17 slot length |
| 3 outside edge | 18 crossbeam |
| 4 side wall | 19 flattened edge |
| 5 grip opening | 20 restriction |
| 6 face wall | 21 passage |

LIST OF REFERENCE NUMBERS -continued

| | |
|---|---|
| 7 face wall | 22 link arm |
| 8 flap | 23 head |
| 9 bearing pin | 24 corner |
| 10 locking pin | 25 middle section |
| 11 locking pin | |
| 12 mounting slot | |
| 13 mounting slot | |
| 14 height difference | |
| 15 flap height | |

I claim:

1. Transport and storage container with base and side walls, in which at least one side wall forms a frame, which is closed at the top, for inserting a flap that can be pivoted off, which flap by means of lower bearing pins, projecting on both sides and arranged coaxially relative to one another, engages in bearing eyes of the frame side parts, and can be inserted by means of locking pins, projecting on both sides and arranged above the bearing pins, into mounting slots of the frame side parts which are accessible via insertion openings from an outer surface, and the inside height of the frame of the flap-bearing side wall or face wall is greater than the flap height, and the slot length of the mounting slots is equal to or smaller in height than the height difference between the frame and flap, and at least one of the mounting slots comprises a restriction as a detent for the corresponding locking pins, and the mounting slots forming the bearing eyes for the bearing pins are designed in the form of longitudinal slots.

2. Transport and storage container according to claim 1, characterised in that the longitudinal slot of the bearing eyes opens upwards into a narrower passage and the bearing pins have a flattened edge angularly displaced relative to the flap plane that is adjusted to fit the passage width.

3. Transport and storage container according to claim 2, characterised in that the longitudinal slot of the bearing eyes is provided in addition as a mounting slot for the bottom locking pin, whereby the passage forms the detent for this locking pin.

4. Transport and storage container according to claim 1, characterised in that the one piece flap, the base, the side walls and face walls (6, 7) are made of the same plastic.

* * * * *

UNITED STATES PATENT AND TRADEMARK OFFICE
CERTIFICATE OF CORRECTION

PATENT NO. : 5,722,555
DATED : March 3, 1998
INVENTOR(S) : Franz PÖLZL

It is certified that error appears in the above-identified patent and that said Letters Patent is hereby corrected as shown below:

On the cover page, column 1, line 2 of item [87], change "May 23, 1995" to --May 26, 1995--.

Signed and Sealed this

First Day of September, 1998

Attest:

BRUCE LEHMAN

Attesting Officer

Commissioner of Patents and Trademarks